US008626204B1

(12) United States Patent
Oroskar et al.

(10) Patent No.: US 8,626,204 B1
(45) Date of Patent: Jan. 7, 2014

(54) DELIVERY OF PAGING INFORMATION TO SETS OF WIRELESS COMMUNICATION DEVICES

(75) Inventors: Siddharth S. Oroskar, Overland Park, KS (US); Sachin R. Vargantwar, Overland Park, KS (US); Maulik K. Shah, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 425 days.

(21) Appl. No.: 12/949,868

(22) Filed: Nov. 19, 2010

(51) Int. Cl.
*H04Q 7/20* (2006.01)
(52) U.S. Cl.
USPC ........ 455/458; 455/426.1; 455/440; 455/436; 455/437; 455/438; 370/338; 370/335
(58) Field of Classification Search
USPC .............................................. 455/426.1, 458
See application file for complete search history.

(56) References Cited

U.S. PATENT DOCUMENTS

| 7,009,954 B2 | 3/2006 | Abrishamkar | |
| 2008/0137588 A1 | 6/2008 | Santhanam | |
| 2009/0285186 A1* | 11/2009 | Chin et al. | 370/335 |
| 2010/0202429 A1* | 8/2010 | Chin et al. | 370/342 |

* cited by examiner

*Primary Examiner* — Charles Appiah
*Assistant Examiner* — Randy Peaches (57) ABSTRACT

What is disclosed is a method of operating a wireless access system. The method includes exchanging wireless communications with a plurality of user devices using a first communication mode that uses a first frequency spectrum and a second communication mode that uses a second frequency spectrum. The method also includes transferring a first bit sequence using the first communication mode to a first set of the user devices to indicate the presence of first pages pending on a paging channel portion of the first communication mode. The method also includes transferring a second bit sequence using the second communication mode to a second set of the user devices to indicate the presence of second pages pending on a paging channel portion of the second communication mode, where the second set of the of user devices tune away from the first communication mode to the second communication mode to receive the second bit sequence. The method also includes configuring a third set of the of user devices to tune away from the first communication mode to the second communication mode to check for the presence of third pages pending on the paging channel portion of the second communication mode.

18 Claims, 5 Drawing Sheets

ND set of the user devices to indicate the presence of second pages pending on a paging channel portion of the second communication mode, where the second set of the of user devices tune away from the first communication mode to the second communication mode to receive the second bit sequence. The transceiver system is also configured to instruct the third set of the of user devices to tune away from the first communication mode to the second communication mode to check for the presence of third pages pending on the paging channel portion of the second communication mode.

DELIVERY OF PAGING INFORMATION TO SETS OF WIRELESS COMMUNICATION DEVICES

TECHNICAL FIELD

Aspects of the disclosure are related to the field of communications, and in particular, paging channels and delivery of pages to wireless communication devices in wireless communication networks.

TECHNICAL BACKGROUND

Wireless access systems typically include wireless access nodes, such as base stations, which provide wireless access to communication services for user devices over wireless links. A typical wireless access system includes many wireless access nodes to provide wireless access across a geographic region, with individual wireless coverage areas associated with each wireless access node. The wireless access nodes exchange user communications and overhead communications between wireless user devices and a core network of the wireless communication system over backhaul communication links.

The wireless access system also typically transfers information to the user devices to indicate incoming voice calls, text messages, network alerts, or other alerts and messages. This information, often referred to as pages, is routed through the wireless access nodes to reach the user devices via a paging channel. Indicators of available pages are sometimes shared by many user devices.

Overview

What is disclosed is a method of operating a wireless access system. The method includes exchanging wireless communications with a plurality of user devices using a first communication mode that uses a first frequency spectrum and a second communication mode that uses a second frequency spectrum. The method also includes transferring a first bit sequence using the first communication mode to a first set of the user devices to indicate the presence of first pages pending on a paging channel portion of the first communication mode. The method also includes transferring a second bit sequence using the second communication mode to a second set of the user devices to indicate the presence of second pages pending on a paging channel portion of the second communication mode, where the second set of the of user devices tune away from the first communication mode to the second communication mode to receive the second bit sequence. The method also includes configuring a third set of the of user devices to tune away from the first communication mode to the second communication mode to check for the presence of third pages pending on the paging channel portion of the second communication mode.

What is also disclosed is a wireless access system. The wireless access system includes a transceiver system configured to exchange wireless communications with a plurality of user devices using a first communication mode that uses a first frequency spectrum and a second communication mode that uses a second frequency spectrum, and a processing system configured to determine a first set of the user devices, a second set of the user devices, and a third set of the user devices. The transceiver system is configured to transfer a first bit sequence using the first communication mode to the first set of the user devices to indicate the presence of first pages pending on a paging channel portion of the first communication mode. The transceiver system is also configured to transfer a second bit sequence using the second communication mode to the sec-

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
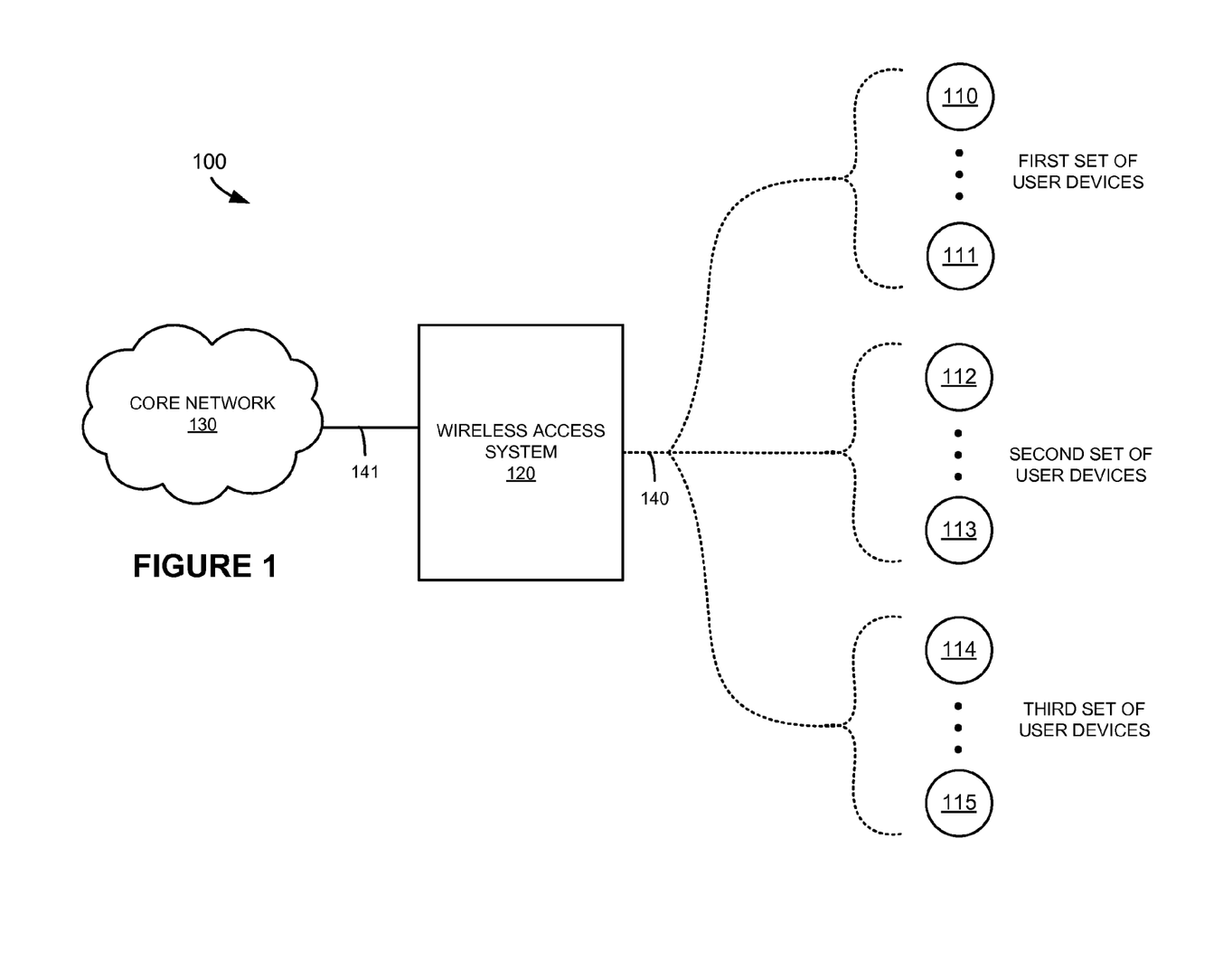
FIG. 1 is a system diagram illustrating a communication system.

FIG. 1 is a system diagram illustrating communication system 100. Communication system 100 includes user devices 110-115, wireless access system 120, and core network 130. User devices 110-115 are grouped into three sets, namely a first set including user devices 110-111, a second set including user devices 112-113, and a third set including user devices 114-115. Although six user devices are shown in FIG. 1, it should be understood that a different number of user devices could be included. User devices 110-115 and wireless access system 120 communicate over wireless link 140. Wireless link 140 could include many different portions, channels, or other sub-links, and wireless link 140 is shown as a single representative branching link in FIG. 1 for clarity. In other examples, a separate wireless link could be shown between each user device and wireless access system 120. Wireless access system 120 and core network 130 communicate over link 141.

In FIG. 1, wireless access system 120 provides wireless access to communication services for each of user devices 110-115. The communication services could include voice calls, messaging, data access, or other communication services provided through wireless access system 120, such as communication services of core network 130. As a part of the wireless access, each of user devices 110-115 can receive paging information, such as pages, from wireless access system 120. These pages indicate incoming voice calls, text messages, network alerts, or other alerts and messages. In typical examples, user devices monitor a paging channel portion of wireless link 140 to check for the presence of pages pending on the paging channel portion. Wireless link 140 could also include a bit sequence over another channelized portion of wireless link 140, where the bit sequence indicates pages pending on the paging channel portion of wireless link 140. The bit sequence could include a series of bit flags, one-hot bit indicators, binary encoded indicators, such as a quick paging channel, among other representations.

Figure 2:
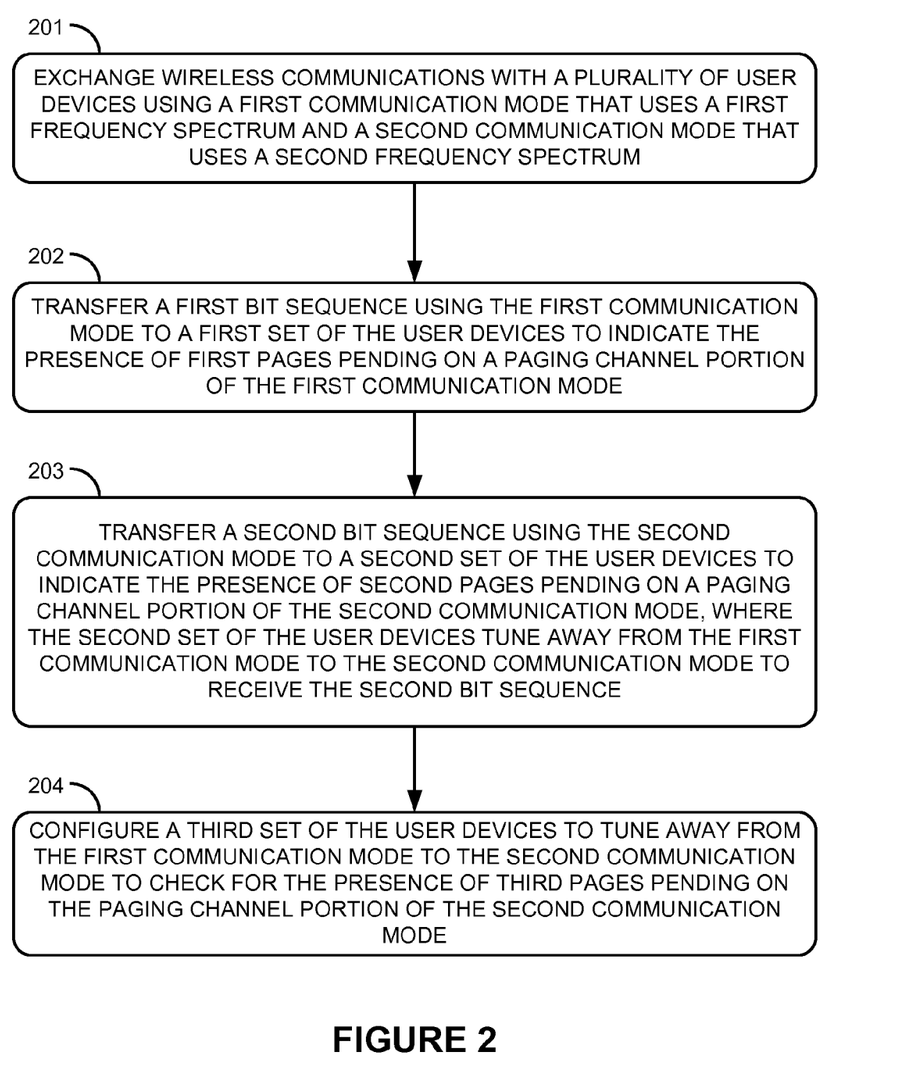
FIG. 2 is a flow diagram illustrating a method of operation of a wireless access system.

FIG. 2 is a flow diagram illustrating a method of operating wireless access system 120. The operations of FIG. 2 are referenced herein parenthetically. In FIG. 2, wireless access system 120 exchanges (201) wireless communications with a plurality of user devices, such as user devices 110-115, using a first communication mode that uses a first frequency spectrum and a second communication mode that uses a second frequency spectrum. The first communication mode and second communication mode include wireless communication modes, such as protocols, wireless spectrum, frequencies, channels, timeslots, or other communication features used to wirelessly exchange communications between wireless access system 120 and user devices 110-115. In some examples, user devices which can communicate over at least two communication modes include dual-mode or multi-mode user devices. Separate transceiver equipment could be included for each of the two communication modes in wireless access system 120 or user devices 110-115. The first frequency spectrum and the second frequency spectrum each include a set of frequencies used for wireless communication between wireless access system 120 and user devices 110-115. In some examples, the two frequency spectrums employ different frequency sets, while in other examples, a portion of the frequency spectrum is shared between the two communication modes, and a portion of the frequency spectrum is not shared between the two communication modes.

Wireless access system 120 transfers (202) a first bit sequence using the first communication mode to a first set of the user devices to indicate the presence of first pages pending on a paging channel portion of the first communication mode. In this example, the first set of the user devices includes user devices 110-111. In this example, the first bit sequence is transferred using the first communication mode, and the paging channel for the first pages is also transferred using the first communication mode. For example, if the first communication mode uses the Evolution Data Optimized (EVDO) communication mode, then the first bit sequence and the paging channel for the first pages is transferred using the EVDO communication mode. Other communication modes could be employed. The first bit sequence could comprise a first quick paging channel (QPCH). In some examples, the first set of the user devices could be selected based on a communication mode of user devices 110-111, or among present communication performance or historical performance of user devices 110-111. In other examples, user devices 110-111 could be selected based on a utilization level of the first communication mode, such as exceeding a utilization threshold, or could be operated by customers who pay for a higher grade of service, among other selections.

Wireless access system 120 transfers (203) a second bit sequence using the second communication mode to a second set of the user devices to indicate the presence of second pages pending on a paging channel portion of the second communication mode, where the second set of the user devices tune away from the first communication mode to the second communication mode to receive the second bit sequence. In this example, the second set of the user devices includes user devices 112-113. In this example, the second bit sequence is transferred using the second communication mode, and the paging channel for the second pages is also transferred using the second communication mode—not using the first communication mode as in operation 202. For example, if the second communication mode uses the single-carrier radio transmission technology link (1xRTT) communication mode, then the second bit sequence and the paging channel for the second pages is transferred using the 1xRTT communication mode. Other communication modes could be employed. The second bit sequence could comprise a second quick paging channel (QPCH). In this example, the first communication mode and the second communication mode are different communication modes. In some examples, the second set of the user devices could be selected based on a communication mode of user devices 112-113, or among present communication performance or historical performance of user devices 112-113. In other examples, user devices 112-113 could be selected based on a utilization level of the first or second communication mode, such as exceeding a utilization threshold, falling below a utilization threshold, or could be operated by customers who pay for a medium grade of service, among other selections.

The tune away from the first communication mode to the second communication mode to receive the second bit sequence could include user devices 112-113 periodically switching from communicating over the first communication mode to communicating over the second communication mode to receive the second bit sequence. In this example, the second bit sequence is not available over the first communication mode, and indication of pending pages on the paging channel of the second communication mode is available by checking the second bit sequence. Tuning away to check the second bit sequence in the second communication mode may require a longer tune away time than merely checking the first bit sequence when user devices 112-113 are already communicating in the first communication mode. Tuning away could also include switching to different transceiver circuitry or equipment of user devices 112-113, communicating with a different portion of wireless access system 120, such as different base station equipment, or could include changing a frequency spectrum used by a transceiver portion of user devices 112-113, among other operations.

Wireless access system 120 configures (204) a third set of the user devices to tune away from the first communication mode to the second communication mode to check for the presence of third pages pending on the paging channel portion of the second communication mode. In this example, the third set of the user devices includes user devices 114-115. As discussed above, in this example, the paging channel for the second pages is transferred using the second communication mode, not using the first communication mode as in operation 202. In this example, the second communication mode and the paging channel portion of the second communication are the same as discussed in operation 203. The third set of the user devices could be selected based on a communication mode of user devices 114-115, or among present communication performance or historical performance of user devices 114-115. In other examples, user devices 114-115 could be selected based on a utilization level of the first or second communication mode, such as exceeding a utilization threshold, falling below a utilization threshold, or could be operated by customers who pay for a low grade of service, among other selections. The tune away from the first communication mode to the second communication mode to check for third pages pending on the paging channel portion of the second communication mode could include user devices 114-115 periodically switching from communicating over the first communication mode to communicating over the second communication mode to check if the third pages are pending. In this example, user devices 114-115 are configured to check the paging channel portion of the second communication mode without first checking the first bit sequence or the second bit sequence, although other configurations could be employed. Tuning away to check the paging channel portion of the second communication mode may require a longer tune away time than merely checking the first bit sequence or the second bit sequence, and could also include switching to different transceiver circuitry or equipment of user devices 114-115, communicating with a different portion of wireless access system 120, such as different base station equipment, or could include changing a frequency spectrum used by a transceiver portion of user devices 114-115, among other operations.

Figure 3:
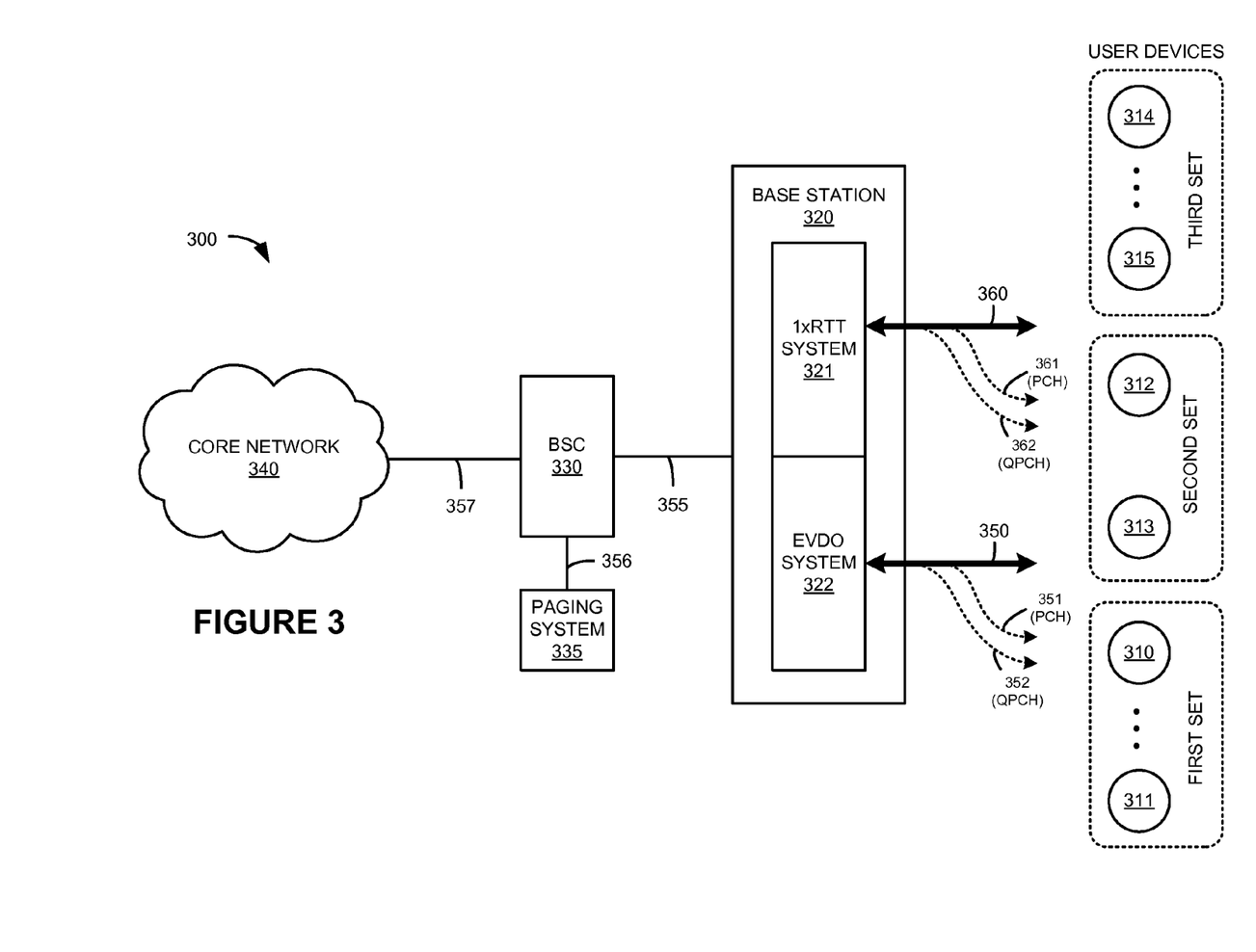
FIG. 3 is a system diagram illustrating a communication system.

FIG. 3 is a system diagram illustrating communication system 300. Communication system 300 includes user devices 310-315, base station 320, base station controller (BSC) 330, paging system 335, and core network 340. Base station 320 and base station controller 330 communicate over backhaul link 355, where backhaul link 355 is a T1 link capable of carrying packet communications in this example. Base station controller 330 and paging system 335 communicate over link 356, where link 356 is an Ethernet link in this example. Base station controller 330 and core network 340 communicate over link 357, where link 357 is an optical networking metropolitan-area network link in this example.

User devices 310-315 are each dual-mode mobile smartphones and can communicate over wireless links with base station 320. User devices 310-315 each can communicate in a first mode over wireless link 350 using the Evolution-Data Optimized (EVDO) wireless protocol and frequency spectrum with EVDO system 322 of base station 320. Link 351 is a paging channel (PCH) provided by EVDO system 322 using the EVDO wireless protocol and frequency spectrum, and link 352 is a quick paging channel (QPCH) provided by EVDO system 322 using the EVDO wireless protocol and frequency spectrum. User devices 310-315 also can communicate in a second mode over wireless link 360 using the Code Division Multiple Access (CDMA) single-carrier radio transmission technology link (1xRTT) wireless protocol and frequency spectrum with 1xRTT system 321 of base station 320. Link 361 is a paging channel provided by 1xRTT system 321 using the 1xRTT wireless protocol and frequency spectrum, and link 362 is a quick paging channel provided by 1xRTT system 321 using the 1xRTT wireless protocol and frequency spectrum.

Base station 320 includes 1xRTT system 321 and EV-DO system 322. 1xRTT system 321 includes RF communication and control circuitry, transceiver, and antennas, as well as wireless communications equipment capable of communicating with and providing communication service and paging information to user devices using the 1xRTT communication mode. EV-DO system 322 includes RF communication and control circuitry, transceiver, and antennas, as well as wireless communications equipment capable of communicating with and providing communication service and paging information to user devices using the EV-DO communication mode. The 1xRTT system 321 and EV-DO system 322 can receive pages and other paging information transferred by paging system 335.

Paging system 335 includes equipment such as processing systems, communication interfaces, and other equipment to obtain pages for delivery to any of user devices 310-315. Paging system 335 can receive pages from BSC 330, pages transferred by core network 340 though BSC 330, or create or modify pages for delivery to user devices 310-315. In some examples, notification of available pages to user devices are transferred through 1xRTT system 321 or EV-DO system 322 of base station 320. In further examples, paging system 335 is incorporated into base station 320, base station controller 330, or other equipment and systems.

Base station controller (BSC) 330 includes equipment such as communication interfaces and processing systems for communicating with and controlling base station 320 over backhaul link 355, and exchanging paging information with paging system 335 over link 356. Base station controller 330 could also include communication equipment capable of routing communications exchanged between base station 320 and core network 340 to further systems and networks. In this example, base station 320 is operated by the same wireless service provider as base station controller 330.

Core network 340 is a core network of a wireless network in this example. Core network 340 could include further base stations, routers, gateways, controller systems, processing systems, access systems, Internet systems, or other communication equipment.

In FIG. 3, base station 320 provides wireless access to communication services for each of user devices 310-315. The communication services could include voice calls, messaging, data access, or other communication services provided through base station 320, such as communication services of core network 340. As a part of the wireless access, each of user devices 310-315 can receive paging information, such as pages, from base station 320. These pages indicate incoming voice calls, text messages, network alerts, or other alerts and messages. In typical examples, user devices monitor a paging channel portion of wireless links to receive pages pending on the paging channel portion. As shown in this example, the wireless links include paging channel portions and quick paging channel portions, where the quick paging channel portions include bit sequences indicating pages pending on the paging channel portion of the associated wireless link. The bit sequence could comprise a series of bit flags, one-hot bit indicators, binary encoded indicators, or semaphores, among other representations.

Figure 4:
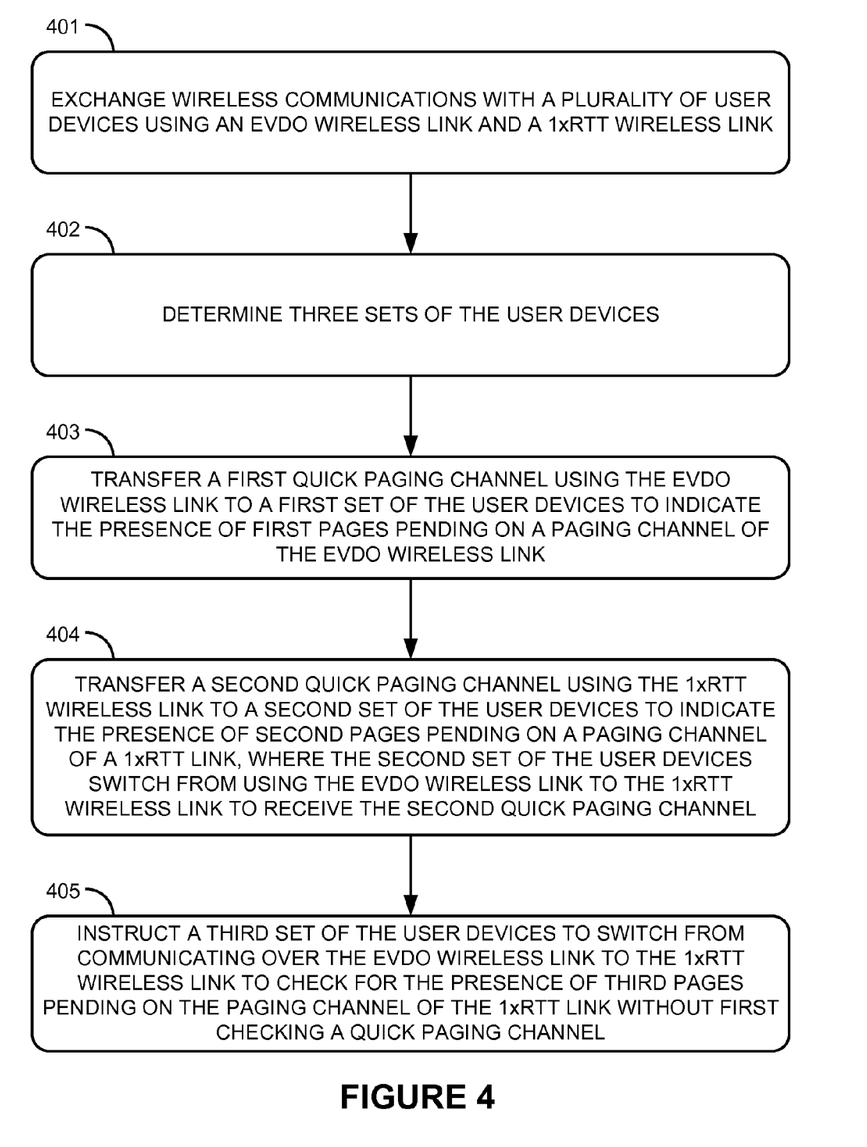
FIG. 4 is a flow diagram illustrating a method of operation of a communication system.

FIG. 4 is a flow diagram illustrating a method of operating communication system 300. The operations of FIG. 4 are referenced herein parenthetically. In FIG. 4, base station 320 exchanges (401) wireless communication with each of user devices 310-315 using EVDO wireless link 350 and 1xRTT wireless link 360. FIG. 3 shows EVDO wireless link 350 associated with EVDO system 322 of base station 320, and 1xRTT wireless link 360 associated with 1xRTT system 321 of base station 320. Although one link each is shown for EVDO wireless link 350 and 1xRTT wireless link 360, it should be understood that this is merely representative of wireless communications using the associated wireless protocol, frequency spectrum, or communication mode associated with each of EVDO wireless link 350 and 1xRTT wireless link 360, and other representations could be employed such as separate links for each user device. EVDO wireless link 350 and 1xRTT wireless link 360 are each shown including a paging channel and a quick paging channel, as described herein. Other channels or portions of each of EVDO wireless link 350 and 1xRTT wireless link 360 could be included, but are absent from FIG. 3 for clarity.

Base station 320 determines (402) three sets of the user devices. As shown in FIG. 3, user devices 310-311 are included in a first set of user devices, user devices 312-313 are included in a second set of user devices, and user devices 314-315 are included in a third set of user devices. The different sets of user devices can be determined according to various criteria. In some examples, the different sets of the user devices could be determined based on a supported or present communication mode of user devices 310-315, or among present communication performance or historical performance of user devices 310-315. In other examples, the different sets of the user devices could be determined based on a utilization level of a particular wireless communication link or communication mode, such as exceeding a data usage level of EVDO wireless link 350 or 1xRTT wireless link 360. In other examples, data usage of each of user devices 310-315 is determined and user devices exceeding a first data usage threshold are included in a first set of user devices, user devices exceeding a second data usage threshold but below the first data usage threshold are included in a second set of user devices, and user devices below the second data usage threshold are included in a third set of user devices. Other usage criteria other than data usage could be employed, such as voice call usage, text message usage, or selection based on an active application on each user device, such as including only user devices streaming video in a set. In further examples, the different sets of user devices could be determined based on customers of user devices who pay for a different level of service, such as paying for a higher grade of service, among other selections. In even further examples, the sets of user devices could be determined based on an application type of the wireless communications, such as data communications, voice calls, voice over IP (VoIP), or other applications types. In yet further examples, the sets of user devices could be determined based on a geographic location.

Base station 320 transfers (403) quick paging channel 352 using EVDO wireless link 350 to the first set of user devices to indicate the presence of first pages pending on paging channel 351 of EVDO wireless link 350. In this example, the first set of user devices includes user devices 310-311. Paging channel 351 of EVDO wireless link 350 is included in a forward link portion of EVDO wireless link 350. Paging channel 351 is used to transfer pages and other paging information to user devices 310-311. The paging information could include call alerts, text messages, audio messages, network alerts, or other information. EVDO system 322 transmits quick paging channel 352 over a forward link portion of EVDO wireless link 350 to indicate the presence of the first pages on paging channel 351. Quick paging channel 352 does not carry actual pages in this example, and instead carries a bit sequence or flag indicators which indicate to user devices that pages are available on paging channel 351. Base station 320 could instruct or configure the first set of user devices to individually check quick paging channel 352 on a repeated or periodic basis to determine if pages are pending on paging channel 351. In response to the indicator on quick paging channel 352, a user device assigned to the associated indicator monitors paging channel 351 to receive the page. In further examples, multiple user devices could share an indicator, such as a bit, on quick paging channel 352, while in other examples, each user device is assigned an exclusive indicator on quick paging channel 352.

Base station 320 transfers (404) quick paging channel 362 using 1xRTT wireless link 360 to a second set of user devices to indicate the presence of second pages pending on paging channel 361 of 1xRTT wireless link 360, where the second set of user devices switch from using EVDO wireless link 350 to 1xRTT wireless link 360 to receive quick paging channel 362. In this example, the second set of user devices includes user devices 312-313. Paging channel 361 of 1xRTT wireless link 360 is included in a forward link portion of 1xRTT wireless link 360. 1xRTT system 321 transmits quick paging channel 362 over a forward link portion of 1xRTT wireless link 360 to indicate the presence of the second pages on paging channel 361. Similar to quick paging channel 352 of EVDO wireless link 350, quick paging channel 362 of 1xRTT wireless link 360 does not carry actual pages in this example, and instead carries a bit sequence or flag indicators which indicate to user devices that pages are available on paging channel 361 of 1xRTT wireless link 360. The second set of user devices each switching from communicating over EVDO wireless link 350 to 1xRTT wireless link 360 to receive quick paging channel 362 could include user devices 312-313 individually switching on a repeated or periodic basis from communicating over EVDO wireless link 350 to communicating over 1xRTT wireless link 360 to check quick paging channel 362. In some examples, switching from communicating over EVDO wireless link 350 to 1xRTT wireless link 360 includes tuning away from an EVDO communication mode to a 1xRTT communication mode, which could include communicating over a different frequency spectrum or wireless communication protocol associated with the wireless link. Switching or tuning away from communicating over EVDO wireless link 350 to 1xRTT wireless link 360 could also include switching to different transceiver circuitry, antennas, or equipment for user devices 312-313, or communicating with a different portion of base station 320, such as 1xRTT system 321 instead of EVDO system 322, among other tune away operations. Base station 320 could instruct or configure the second set of user devices to individually check quick paging channel 362 to determine if pages are pending on paging channel 361. In response to the indicator on quick paging channel 362, a user device assigned to the associated indicator monitors paging channel 361 to receive the page.

Base station 320 instructs (405) a third set of user devices to switch from communicating over EVDO wireless link 350 to 1xRTT wireless link 360 to check for the presence of third pages pending on paging channel 361 of 1xRTT wireless link 360 without first checking quick paging channel 362 or quick paging channel 352. In this example, the third set of user devices includes user devices 314-315. As discussed above, paging channel 361 of 1xRTT wireless link 360 is included in a forward link portion of 1xRTT wireless link 360. In response to being configured to switch from communicating over EVDO wireless link 350 to 1xRTT wireless link 360 to check for the presence of third pages pending on paging channel 361 of 1xRTT wireless link 360, each of user devices 314-315 periodically monitors paging channel 361 to check for any pending pages. In this example, quick paging channel 362 or quick paging channel 352 are not checked by user devices 314-315 prior to checking paging channel 361. In some examples, switching from communicating over EVDO wireless link 350 to 1xRTT wireless link 360 includes tuning away from an EVDO communication mode to a 1xRTT communication mode, which could include communicating over a different frequency spectrum or wireless communication protocol associated with the wireless link. Switching or tuning away from communicating over EVDO wireless link 350 to 1xRTT wireless link 360 could also include switching to different transceiver circuitry, antennas, or equipment for user devices 314-315, or communicating with a different portion of base station 320, such as 1xRTT system 321 instead of EVDO system 322, among other tune away operations.

In further examples, base station 320 determines a fourth set of user devices, and instructs the fourth set of user devices to check for the presence of fourth pages pending on paging channel 351 of EVDO wireless link 350 without first checking quick paging channel 352 or quick paging channel 362. In response to being configured to check for the presence of fourth pages pending on paging channel 351 of EVDO wireless link 350, each of the user devices in the fourth set periodically monitors paging channel 351 to check for any pending pages. In this example, quick paging channel 362 or quick paging channel 352 are not checked by the user devices in the fourth set prior to checking paging channel 351.

As discussed herein, pages could include call alerts, text messages, audio messages, network alerts, or other information. In some examples, user pages include pages which are sent by other user devices or in response to activity of other user devices, such as text messages, incoming call alerts, multimedia messages, or other user generated paging information. System pages could also be differentiated from user pages, where system pages include network alerts, emergency alerts, network configuration information, or other pages sent in response to network or wireless link activity or status. In examples with separate user pages and system pages, quick paging channel 352 could be used to indicate the presence of user pages, and quick paging channel 362 or a separate quick paging channel associated with EVDO wireless link 350, could be used to indicate the presence of system pages. Using separate quick paging channels for user pages and system pages for a set of user devices could include configuring the set of user devices to periodically check quick paging channel 362 by tuning away to 1xRTT wireless link 360 to check for pending system pages and remaining tuned to EVDO wireless link 350 to check for pending user pages using quick paging channel 352.

The individual paging channels (PCH) or quick paging channels (QPCH) could operate using different associated spreading codes. Spreading codes typically comprise random or pseudo-random sequences, such as Walsh codes, to spread radio frequency (RF) energy in a random or pseudo-random fashion to logically separate one communication portion from another. In some examples, individual paging channels or quick paging channels could have separate frequencies associated therewith, such as carrier frequencies, modulation frequencies, channel frequencies, or other frequency-dependent separation. In yet further examples, different timeslots could be used to distinguish the individual paging portions of a paging channel, or to distinguish paging channels from quick paging channels. It should be understood that a combination of timeslots, frequencies, or spreading codes, among other techniques, could be used.

Figure 5:
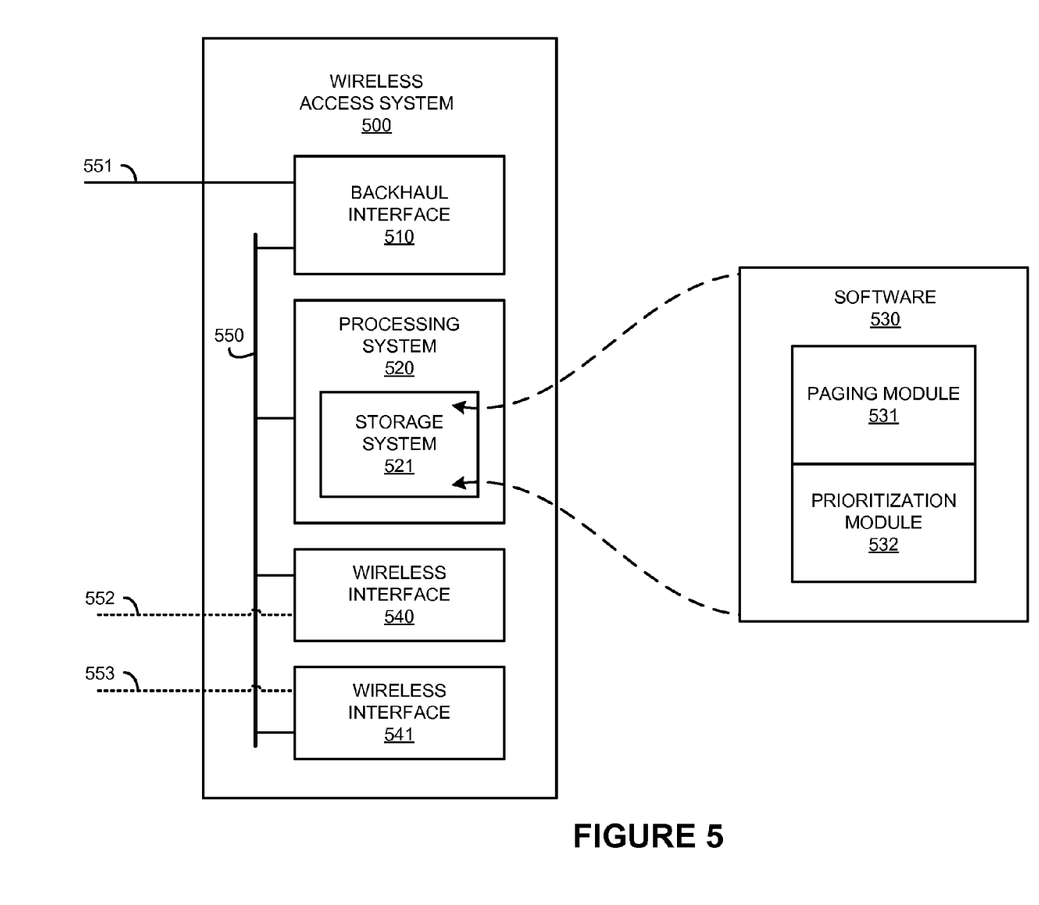
FIG. 5 is a block diagram illustrating a wireless access system.

FIG. 5 is a block diagram illustrating wireless access system 500, as an example of wireless access system 120 found in FIG. 1 or base station 320 found in FIG. 3, although wireless access system 120 or base station 320 could use other configurations. Wireless access system 500 includes backhaul interface 510, processing system 520, and wireless interfaces 540-541. Backhaul interface 510, processing system 520, and wireless interfaces 540-541 communicate over bus 550. Wireless access system 500 may be distributed among multiple devices that together form elements 510, 520-521, 530-532, 540-541, and 550-553.

Backhaul interface 510 comprises network router and gateway equipment for communicating with a network of a wireless communication provider, such as with a wireless network control system, core network, paging system, base station controller, or other wireless access system. Backhaul interface 510 exchanges user communications and overhead communications over link 551. In some examples, backhaul interface 510 receives pages over link 551 for delivery to user devices. Link 551 could use various protocols or communication formats as described herein for links 141 or 355-357, including combinations, variations, or improvements thereof.

Processing system 520 includes storage system 521. Processing system 520 retrieves and executes software 530 from storage system 521. In some examples, processing system 520 is located within the same equipment in which backhaul interface 510 or wireless interfaces 540-541 are located. In further examples, processing system 520 comprises specialized circuitry, and software 530 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices.

Software 530 may include an operating system, logs, utilities, drivers, networking software, and other software typically loaded onto a computer system. Software 530 could contain application programs, server software, firmware, or some other form of computer-readable processing instructions. When executed by processing system 520, software 530 directs processing system 520 to operate as described herein, such as determine sets of wireless communication devices, instruct wireless interfaces 540-541 to exchange wireless communications over different communication modes, protocols, or spectrums with wireless communication devices, determine bit sequences and paging channels for transfer to wireless communication devices, and configure wireless communication devices to tune away between different communication modes, among other operations.

In this example, software 530 includes paging module 531 and prioritization module 532. It should be understood that a different configuration could be employed, and individual modules of software 530 could be included in different equipment than wireless access system 500. Paging module 531 determines pages for delivery to wireless communication devices over wireless links 552-553. In some examples, pages are received over backhaul interface 510, while in other examples, paging module 531 originates pages. Paging module 531 also determines bit sequences, such as quick paging channels, for indicating the presence of pages on paging channels. Prioritization module 532 determines sets of multiple wireless communication devices for assigning and apportioning paging channels and quick paging channel resources across wireless communication devices receiving wireless access through wireless access system 500. Prioritization module 532 communicates with paging module 531 to determine content of paging channels and quick paging channels, such as which paging channel portions or quick paging channel bits are assigned to particular wireless communication devices. Prioritization module 532 could also determine the sets of wireless communication devices based on past usage statistics, service levels, device capability, or other factors of wireless communication devices, as discussed herein.

Wireless interfaces 540-541 each comprises communication interfaces for communicating with user devices. Wireless interfaces 540-541 could each include transceiver equipment and antenna elements for wirelessly exchanging user communications and overhead communications, such as pages, with user devices in a wireless communication system, omitted for clarity, over the associated wireless links 552-553. In some examples, two or more of the associated wireless links 552-553 are used to communicate with a single user device or set of user devices. Wireless interfaces 540-541 also each receive command and control information and instructions from processing system 520 or backhaul interface 510 for controlling the operations of user devices over the associated wireless links 552-553, coordinating handoffs of user devices between each other or other wireless access nodes, providing paging channels, transmitting notifications to indicate the presence of pages on the paging channels, and transferring pages for delivery to user devices. Wireless links 552-553 could each use various protocols or communication formats as described herein for wireless links 140, 350-352, or 360-

362, including combinations, variations, or improvements thereof. In some examples, wireless interfaces 540-541 each operate in a different communication mode, and provide wireless access to communication services over the respective communication mode over the associated wireless links 552-553.

Bus 550 comprises a physical, logical, or virtual communication link, capable of communicating data, control signals, and communications, along with other information. In some examples, bus 550 is encapsulated within the elements of backhaul interface 510, processing system 520, or wireless interfaces 540-541, and may be a software or logical link. In other examples, bus 550 uses various communication media, such as air, space, metal, optical fiber, or some other signal propagation path, including combinations thereof. Bus 550 could be a direct link or might include various equipment, intermediate components, systems, and networks.

Referring back to FIG. 1, user devices 110-115 each comprise radio frequency (RF) communication circuitry and antenna elements. The RF communication circuitry typically includes amplifiers, filters, modulators, and signal processing circuitry. In many examples, user devices 110-115 each include circuitry and equipment to exchange communications of multiple wireless communication services over multiple wireless links, or with multiple base stations. User devices 110-115 may each also include user interface systems, memory devices, computer-readable storage mediums, software, processing circuitry, or some other communication components. User devices 110-115 each may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although six user devices are shown in FIG. 1, it should be understood that a different number of user devices could be shown.

Wireless access system 120 comprises RF communication and control circuitry, antenna elements, and communication routing equipment and systems. The RF communication circuitry typically includes amplifiers, filters, RF modulators, transceivers, and signal processing circuitry. In many examples, wireless access system 120 includes equipment to provide wireless access and communication services over different communication modes to groups of user devices, such as the sets of user devices shown in FIG. 1, as well as route communications between core network 130 and user devices 110-115, provide providing paging channels, transmit notifications to indicate the presence of pages on the paging channels, and transfer pages for delivery to user devices 110-115. Wireless access system 120 may also comprise data modems, routers, servers, memory devices, software, processing circuitry, cabling, network communication interfaces, physical structural supports, or other communication apparatuses. Wireless access system 120 may also comprise wireless access nodes, base stations, base transceiver stations, base station controllers (BSC), mobile switching centers (MSC), radio node controllers (RNC), or other communication equipment and apparatuses.

Core network 130 could include further wireless access nodes, or could include base station controllers (BSC), mobile switching centers (MSC), radio node controllers (RNC), call processing systems, authentication, authorization and accounting (AAA) equipment, access service network gateways (ASN-GW), Internet access nodes, telephony service nodes, wireless data access points, or other wireless communication systems, including combinations thereof. Core network 130 may also comprise optical networks, asynchronous transfer mode (ATM) networks, packet networks, metropolitan-area networks (MAN), or other network topologies, equipment, or systems, including combinations thereof. In typical examples, core network 130 includes many wireless access nodes and associated equipment for providing communication services to many user devices across a geographic region.

Wireless link 140 uses the air or space as the transport media. Wireless link 140 may use various protocols, such as Code Division Multiple Access (CDMA), Evolution-Data Optimized (EV-DO), single-carrier radio transmission technology link (1xRTT), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one wireless link 140 is shown in FIG. 1, it should be understood that wireless link 140 is merely illustrative to show multiple communication modes or wireless access pathways for sets of user devices 110-115. In other examples, a multiple wireless links could be shown, with portions of the multiple wireless links shared between user devices 110-115 and used for different communication sessions and associated paging or overhead communications.

Communication link 141 uses metal, glass, optical, air, space, or some other material as the transport media. Communication link 141 could use various communication protocols, such as Time Division Multiplex (TDM), asynchronous transfer mode (ATM), Internet Protocol (IP), Ethernet, synchronous optical networking (SONET), circuit-switched, communication signaling, or some other communication format, including combinations, improvements, or variations thereof. Communication link 141 could be a direct links or may include intermediate networks, systems, or devices.

Links 140-141 may each include many different signals sharing the same link—as represented by the associated lines in FIG. 1—comprising access channels, paging channels, notification channels, forward links, reverse links, user communications, communication sessions, overhead communications, frequencies, other channels, carriers, timeslots, spreading codes, transportation ports, logical transportation links, network sockets, packets, or communication directions. In many examples, the portion of wireless links 140-141 as transmitted by the associated ones of user devices 110-115 is referred to an uplink or reverse link of the wireless link, while the portion as transmitted by wireless access system 120 is referred to as a downlink or forward link of the wireless link.

FIGS. 1-5 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless access system, the method comprising:
  exchanging wireless communications with a plurality of user devices using a first communication mode that uses a first frequency spectrum and a second communication mode that uses a second frequency spectrum;

transferring a first bit sequence using the first communication mode to a first set of the user devices to indicate the presence of first pages pending on a paging channel portion of the first communication mode;

transferring a second bit sequence using the second communication mode to a second set of the user devices to indicate the presence of second pages pending on a paging channel portion of the second communication mode, wherein the second set of the of user devices tune away from the first communication mode to the second communication mode to receive the second bit sequence; and configuring a third set of the of user devices to tune away from the first communication mode to the second communication mode to check for the presence of third pages pending on the paging channel portion of the second communication mode, without checking for the presence of the third pages using the first bit sequence or the second bit sequence.

2. The method of claim 1, wherein the first bit sequence comprises a first quick paging channel and the second bit sequence comprises a second quick paging channel.

3. The method of claim 2, wherein the first quick paging channel comprises an Evolution Data Optimized (EVDO) quick paging channel and the second quick paging channel comprises a single-carrier radio transmission technology link (1xRTT) quick paging channel.

4. The method of claim 1, wherein the first communication mode comprises Evolution Data Optimized (EVDO) wireless communication mode, and the second communication mode comprises single-carrier radio transmission technology link (1xRTT) wireless communication mode.

5. The method of claim 1, further comprising:
determining the first set of the user devices based on a first data usage amount of each of the plurality of user devices;
determining the second set of the user devices based on a second data usage amount of each of the plurality of user devices; and
determining the third set of the user devices based on a third data usage amount of each of the plurality of user devices.

6. The method of claim 1, further comprising:
determining the first set of the user devices based on a first wireless service level of each of the plurality of user devices;
determining the second set of the user devices based on a second wireless service level of each of the plurality of user devices; and
determining the third set of the user devices based on a third wireless service level of each of the plurality of user devices.

7. The method of claim 1, further comprising:
configuring the first set of the user devices to periodically check the first bit sequence using the first communication mode without tuning away to the second communication mode;
configuring the second set of the user devices to periodically check the second bit sequence by tuning away to the second communication mode; and
configuring the third set of the of user devices to periodically check the paging channel portion of the second communication mode by tuning away to the second communication mode without periodically checking the first bit sequence or the second bit sequence to determine if the third pages are pending.

8. The method of claim 1, further comprising:
configuring a fourth set of the of user devices to check for the presence of fourth pages pending on the paging channel portion of the first communication mode without tuning away from the first communication mode and without checking the first bit sequence or the second bit sequence to determine if the fourth pages are pending.

9. The method of claim 1, wherein transferring the first bit sequence using the first communication mode to the first set of the user devices to indicate the presence of first pages pending on the paging channel portion of the first communication mode comprises indicating the presence of user pages using the first bit sequence; and further comprising:
configuring the first set of the user devices to periodically check the second bit sequence by tuning away to the second communication mode to check for pending system pages;
wherein the user pages comprise at least one of an incoming voice call notification and a text message, and wherein the system pages comprise network configuration information.

10. A wireless access system, comprising:
a transceiver system configured to exchange wireless communications with a plurality of user devices using a first communication mode that uses a first frequency spectrum and a second communication mode that uses a second frequency spectrum;
a processing system configured to determine a first set of the user devices, a second set of the user devices, and a third set of the user devices;
the transceiver system configured to transfer a first bit sequence using the first communication mode to the first set of the user devices to indicate the presence of first pages pending on a paging channel portion of the first communication mode;
the transceiver system configured to transfer a second bit sequence using the second communication mode to the second set of the user devices to indicate the presence of second pages pending on a paging channel portion of the second communication mode, wherein the second set of the of user devices tune away from the first communication mode to the second communication mode to receive the second bit sequence; and
the transceiver system configured to instruct the third set of the of user devices to tune away from the first communication mode to the second communication mode to check for the presence of third pages pending on the paging channel portion of the second communication mode, without checking for the presence of the third pages using the first bit sequence or the second bit sequence.

11. The wireless access system of claim 10, wherein the first bit sequence comprises a first quick paging channel and the second bit sequence comprises a second quick paging channel.

12. The wireless access system of claim 11, wherein the first quick paging channel comprises an Evolution Data Optimized (EVDO) quick paging channel and the second quick paging channel comprises a single-carrier radio transmission technology link (1xRTT) quick paging channel.

13. The wireless access system of claim 10, wherein the first communication mode comprises Evolution Data Optimized (EVDO) wireless communication mode, and the second communication mode comprises single-carrier radio transmission technology link (1xRTT) wireless communication mode.

14. The wireless access system of claim 10, wherein the processing system is configured to determine the first set of the user devices based on a first data usage amount of each of the plurality of user devices, determine the second set of the user devices based on a second data usage amount of each of the plurality of user devices, and determine the third set of the user devices based on a third data usage amount of each of the plurality of user devices.

15. The wireless access system of claim 10, wherein the processing system is configured to determine the first set of the user devices based on a first wireless service level of each of the plurality of user devices, determine the second set of the user devices based on a second wireless service level of each of the plurality of user devices, and determine the third set of the user devices based on a third wireless service level of each of the plurality of user devices.

16. The wireless access system of claim 10, comprising:
the transceiver system configured to instruct the first set of the user devices to periodically check the first bit sequence using the first communication mode without tuning away to the second communication mode;
the transceiver system configured to instruct the second set of the user devices to periodically check the second bit sequence by tuning away to the second communication mode; and
the transceiver system configured to instruct the third set of the of user devices to periodically check the paging channel portion of the second communication mode by tuning away to the second communication mode without periodically checking the first bit sequence or the second bit sequence to determine if the third pages are pending.

17. The wireless access system of claim 10, comprising:
the processing system configured to determine a fourth set of the user devices; and
the transceiver system configured to instruct the fourth set of the of user devices to check for the presence of fourth pages pending on the paging channel portion of the first communication mode without tuning away from the first communication mode and without checking the first bit sequence or the second bit sequence to determine if the fourth pages are pending.

18. The wireless access system of claim 10, wherein the transceiver system is configured to indicate the presence of user pages using the first bit sequence, and wherein the transceiver system is further configured to instruct the first set of the user devices to periodically check the second bit sequence by tuning away to the second communication mode to check for pending system pages;
wherein the user pages comprise at least one of an incoming voice call notification and a text message, and wherein the system pages comprise network configuration information.

* * * * *